United States Patent
Chen et al.

(10) Patent No.: US 11,290,904 B2
(45) Date of Patent: Mar. 29, 2022

(54) MEASUREMENT METHOD, MEASUREMENT CONFIGURATION METHOD, USER EQUIPMENT AND BASE STATION

(71) Applicant: VIVO MOBILE COMMUNICATION CO., LTD., Chang'an Dongguan (CN)

(72) Inventors: Li Chen, Chang'an Dongguan (CN); Xueming Pan, Chang'an Dongguan (CN); Kai Wu, Chang'an Dongguan (CN); Yu Ding, Chang'an Dongguan (CN); Dajie Jiang, Chang'an Dongguan (CN); Fei Qin, Chang'an Dongguan (CN); Xiaodong Shen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/646,362

(22) PCT Filed: Aug. 31, 2018

(86) PCT No.: PCT/CN2018/103570
§ 371 (c)(1),
(2) Date: Mar. 11, 2020

(87) PCT Pub. No.: WO2019/047785
PCT Pub. Date: Mar. 14, 2019

(65) Prior Publication Data
US 2020/0275296 A1    Aug. 27, 2020

(30) Foreign Application Priority Data
Sep. 11, 2017    (CN) .......................... 201710812860.9

(51) Int. Cl.
*H04W 24/10*    (2009.01)
*H04W 76/28*    (2018.01)
(Continued)

(52) U.S. Cl.
CPC ........... *H04W 24/10* (2013.01); *H04W 24/08* (2013.01); *H04W 52/0216* (2013.01);
(Continued)

(58) Field of Classification Search
CPC ..... H04W 24/10; H04W 76/28; H04W 24/08; H04W 52/0216; H04W 68/02;
(Continued)

(56) References Cited

U.S. PATENT DOCUMENTS

2013/0260741 A1    10/2013    Yamada
2014/0334333 A1    11/2014    Xu et al.
(Continued)

FOREIGN PATENT DOCUMENTS

CN    104285418 A    1/2015
CN    105981447 A    9/2016
(Continued)

OTHER PUBLICATIONS

European Search Report Application No. 18853317.8; dated May 15, 2020.
(Continued)

*Primary Examiner* — Inder P Mehra
(74) *Attorney, Agent, or Firm* — von Briesen & Roper, s.c.

(57) ABSTRACT

A measurement method, a measurement configuration method, a user equipment and a base station are provided. The measurement method includes: receiving a preset indication signaling transmitted by a base station, the preset indication signaling is configured to indicate whether it is needed for the user equipment to perform a radio resource
(Continued)

management RRM measurement; performing the RRM measurement when the preset indication signaling indicates that it is needed for the UE to perform the RRM measurement.

20 Claims, 3 Drawing Sheets

(51) Int. Cl.
*H04W 24/08* (2009.01)
*H04W 52/02* (2009.01)
*H04W 68/02* (2009.01)
*H04W 72/04* (2009.01)

(52) U.S. Cl.
CPC ......... *H04W 68/02* (2013.01); *H04W 72/042* (2013.01); *H04W 76/28* (2018.02)

(58) Field of Classification Search
CPC .......... H04W 72/042; H04W 52/0229; H04W 52/0212; H04W 52/0225; Y02D 30/70
USPC ........................................................ 370/329
See application file for complete search history.

(56) References Cited

U.S. PATENT DOCUMENTS

| | | | |
|---|---|---|---|
| 2015/0009898 A1 | 1/2015 | Rosa et al. | |
| 2015/0163687 A1* | 6/2015 | Lee | H04L 5/0048 370/252 |
| 2016/0128128 A1 | 5/2016 | Ang et al. | |
| 2016/0183112 A1* | 6/2016 | Yang | H04B 17/18 370/252 |
| 2016/0360454 A1 | 12/2016 | Soldati | |
| 2017/0013561 A1 | 1/2017 | Soldati | |
| 2017/0019810 A1* | 1/2017 | Wu | H04W 72/0453 |
| 2017/0202055 A1 | 7/2017 | Feuersaenger et al. | |
| 2017/0303290 A1* | 10/2017 | Wu | H04W 76/18 |
| 2017/0339588 A1* | 11/2017 | Moon | H04W 76/27 |
| 2018/0041993 A1* | 2/2018 | Xu | H04W 72/042 |
| 2018/0098370 A1* | 4/2018 | Bangolae | H04W 88/04 |
| 2018/0109985 A1* | 4/2018 | Huang | H04W 36/0094 |
| 2018/0206214 A1* | 7/2018 | Bendlin | H04W 72/042 |
| 2019/0028906 A1* | 1/2019 | Chen | H04W 92/18 |
| 2019/0028974 A1* | 1/2019 | Wang | H04W 52/243 |

FOREIGN PATENT DOCUMENTS

| | | |
|---|---|---|
| CN | 106105330 A | 11/2016 |
| EP | 2963965 A1 | 1/2016 |
| EP | 3499947 A1 | 6/2019 |
| WO | WO 2016/146147 A1 | 9/2016 |
| WO | WO 2016/166182 A1 | 10/2016 |
| WO | 2017023370 A1 | 2/2017 |

OTHER PUBLICATIONS

International Search Report & Written Opinion related to Application No. PCT/CN2018/103570; dated Nov. 14. 2018.
European Office Action for related Application No. 18853317.8; dated Apr. 13, 2021.
Chinese Office Action for related Application No. 201710812860.9; dated Jul. 14, 2021.

* cited by examiner

MEASUREMENT METHOD, MEASUREMENT CONFIGURATION METHOD, USER EQUIPMENT AND BASE STATION

CROSS-REFERENCE TO RELATED APPLICATION

The present application is the U.S. national phase of PCT Application No. PCT/CN2018/103570 filed on Aug. 31, 2018, which claims a priority to the Chinese patent application No. 201710812860.9 filed in China on Sep. 11, 2017, a disclosure of which is incorporated herein by reference in its entirety.

TECHNICAL FIELD

The present disclosure relates to the field of communication technology, in particular to a measurement method, a measurement configuration method, a user equipment (UE) and a base station.

BACKGROUND

In a connected state, a UE has to remain in a wake-up state in the duration of a drx-InactivityTimer even if there is no corresponding grant for scheduling, which causes power waste of UE. When there is no corresponding data grant, an onDuration Timer wakes up UE in every discontinuous reception (DRX) cycle, which also causes unnecessary power waste.

To save power in UE, it is proposed that a wake-up stage is introduced before the start of a DRX in the connected state, such that UE firstly enters the wake-up stage before starting an onDuration stage. When a base station has data to be transmitted to corresponding UE, the base station sends a wake-up signaling to the UE, to instruct the UE to wake up in a next DRX cycle to receive data or a grant. After receiving the wake-up signaling, the UE wakes up from a DRX off state. If no wake-up signaling is received, UE continues sleeping. This could reduce power consumed by UE to receive a physical downlink control channel (PDCCH) and power consumed in ramp-up and ramp-down processes.

For a long term evolution (LTE) system, measurement-related configurations and measurement report events are defined in radio resource control (RRC) protocol. UE measures a serving cell and all cells in a stored cell list according to a measurement configuration, and reports a measurement result. The measurement report process may be periodic or event-triggered, which is defined in the 36.331 protocol.

Measurement-related requirements are defined in the technical specification 36.133. For a serving cell, when the connected mode DRX is not configured, if the measurement report is configured, then one measurement sample is required in a certain measurement duration (e.g., 200 ms); if the measurement report is not configured, measurement needs to be performed for downlink synchronization. When the connected mode DRX is configured, the measurement requirements are set according to a DRX pattern, for example, at least one measurement sample in a certain measurement duration (N DRX cycles). For neighboring cells, it is required to measure up to 8 strongest cells. Specifically when to acquire the measurement sample by measuring may depend on the implementation of UE.

For the idle state measurement, trigger conditions of neighboring cell measurement are defined in the technical specification 36.304. Moreover, measurement-related requirements are also defined in the technical specification 36.133.

For LTE system, the protocol regarding the idle-mode in TS36.304 defines configurations related to the idle state measurement and trigger conditions of neighboring cell measurement.

In determining whether to measure an intra-frequency neighboring cell for the purpose of cell selection or re-selection, if the serving cell meets a criterion that a signal reception performance is higher than a threshold (e.g., Srxlev>SIntraSearchP and Squal>SIntraSearchQ), then UE opts not to measure the intra-frequency neighboring cell; otherwise, if the signal reception performance is lower than the threshold, then it is needed to measure the intra-frequency neighboring cell. The signal reception performance refers to reference signal receiving power (RSRP) and/or reference signal receiving quality (RSRQ).

For an inter-frequency scenario and an inter-radio access technology (inter-RAT) scenario, when a neighboring cell has a priority higher than that of current serving frequency and RAT, UE measures the neighboring cell according to the measurement requirements defined in the 36.133 protocol. When a neighboring cell has a priority equal to or lower than that of current serving frequency and RAT, if the serving cell meets a criterion that a signal reception performance is higher than a threshold (e.g., Srxlev>SnonIntraSearchP and Squal>SnonIntraSearchQ), then UE opts not to measure the neighboring cell; otherwise, if the signal reception performance is lower than the threshold, then it is needed to measure the neighboring cell.

In an LTE or 5G communication system, UE in an RRC_IDLE state needs to detect, in a preconfigured time duration, a paging signal transmitted by the base station. A procedure of detecting the paging signal is as follows: blind-detecting a PDCCH corresponding to a paging radio network temporary identifier (P-RNTI, aka Paging-RNTI), if the PDCCH is not detected, proceeding to end the detection; if the PDCCH is detected, further detecting a physical downlink shared channel (PDSCH) indicated by the PDCCH; if the detected PDSCH is not a paging signal for the UE, ending the detection, otherwise, the detected PDSCH is a paging signal for the UE.

Since UE in an RRC_IDLE state detects the paging signal periodically, and the probability of receiving a paging signal destined for the UE is relatively low, and the power consumption of each detection of PDCCH and PDSCH is relatively large, the power efficiency of UE is negatively affected.

Figure 1:
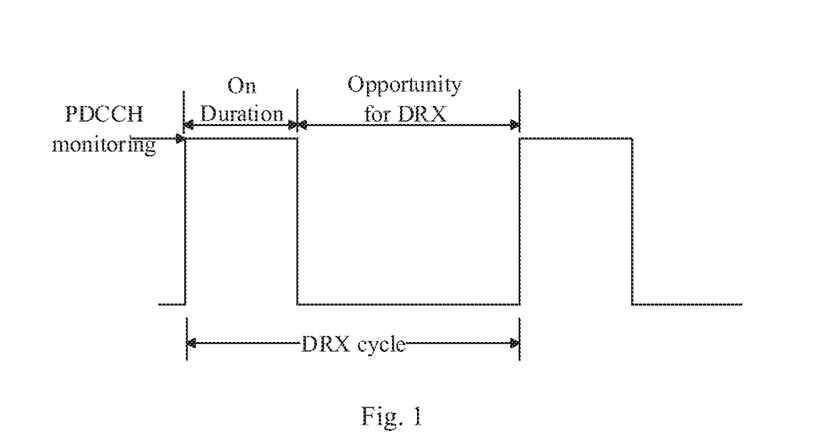
FIG. 1 illustrates a schematic diagram of a division of DRX cycles.

A basic scheme of DRX is to assign a DRX cycle for UE in an RRC_CONNECTED state. The DRX cycle consists of an On Duration and an Opportunity for DRX. In the On Duration, UE monitors and receives a PDCCH (active period); in the Opportunity for DRX, UE refrains from receiving downlink channel data to save power (sleep period). As can be seen in FIG. 1, in time domain, time is divided into a series of consecutive DRX cycles.

In most cases, when UE is scheduled to receive or transmit data in a certain subframe, it is likely that the UE will be continuously scheduled in the next several subframes. If the data reception or transmission is deferred to the next DRX cycle, additional latency will result. To reduce such latency, UE remains in the active period after being scheduled, that is, UE keeps monitoring the PDCCH in a configured active period. An implementation mechanism thereof is: every time UE is scheduled to initially transmit data (please be noted, it is initial transmission instead of retransmission), a drx-InactivityTimer is activated (or reactivated), and UE will remain in the active state until the timer expires. The drx-InactivityTimer specifies a quantity of consecutive subframes in which the UE remains in the active state after the UE has successfully decoded a PDCCH indicating initially transmitted uplink (UL) or downlink (DL) user data. That is, every time UE is scheduled for an initial data transmission, the timer is reactivated once.

To further reduce power consumption of blind-detecting a paging signal or PDCCH in these two kinds of DRXs, concepts of wake-up signaling (WUS) and go to sleep signaling (GTS) are proposed.

WUS: in an idle state or in every DRX cycle of an RRC connected state, the base station transmits a wake-up signaling to UE firstly before the UE blind-detects a paging signal or PDCCH, and the UE wakes up in a corresponding time instant to detect the wake-up signaling. If the wake-up signaling is detected by the UE, the UE blind-detects the paging signal or PDCCH; otherwise, the UE refrains from blind-detecting the paging signal or PDCCH (the UE keeps sleeping).

Compared with the blind-detection of the paging signal or PDCCH, the detection of the wake-up signaling is less complicated and more power efficient.

GTS: in an idle state or in every DRX cycle of an RRC connected state, the base station transmits a go to sleep signaling to UE firstly before the UE blind-detects a paging signal or PDCCH, and the UE wakes up in a corresponding time instant to detect the go to sleep signaling. If the go to sleep signaling is detected by the UE, the UE refrains from blind-detecting the paging signal or PDCCH (the UE keeps sleeping); otherwise, the UE blind-detects the paging signal or PDCCH.

Compared with the blind-detection of the paging signal or PDCCH, the detection of the go to sleep signaling is less complicated and more power efficient.

It is noted, when the PDCCH detection and the paging signal reception are implemented by using the wake-up signaling (WUS) to achieve power saving, if the conventional measurement requirements are followed, then a power saving effect attempted to be achieved by using the WUS may not be achieved at all or may be insignificant (depending on the configuration).

SUMMARY

Some embodiments of the present disclosure provide a measurement method, including: receiving a preset indication signaling transmitted by a base station, where the preset indication signaling is configured to indicate whether it is needed for a UE to perform a radio resource management (RRM) measurement; performing the RRM measurement when the preset indication signaling indicates that it is needed for the UE to perform the RRM measurement.

Some embodiments of the present disclosure further provide a measurement configuration method, including: transmitting a preset indication signaling to a UE; where the preset indication signaling is configured to indicate whether the UE is to perform RRM measurement.

Some embodiments of the present disclosure further provide a UE, including: a reception module, configured to receive a preset indication signaling transmitted by a base station, where the preset indication signaling is configured to indicate whether it is needed for the UE to perform RRM measurement; a measurement module, configured to perform the RRM measurement when the preset indication signaling indicates that it is needed for the UE to perform the RRM measurement.

Some embodiments of the present disclosure further provide a UE, including: a memory, a processor and a program stored in the memory and configured to be executed by the processor, where the processor is configured to execute the program, to implement steps of the foregoing measurement method.

Some embodiments of the present disclosure further provide a computer readable storage medium storing therein a program, where the program is executed by a processor, to implement steps of the foregoing measurement method.

Some embodiments of the present disclosure further provide a base station, including: a second transmission module, configured to transmit a preset indication signaling to a UE; where the preset indication signaling is configured to indicate whether the UE is to perform RRM measurement.

Some embodiments of the present disclosure further provide a base station, including: a memory, a processor and a program stored in the memory and configured to be executed by the processor, where the processor is configured to execute the program, to implement steps of the foregoing measurement configuration method.

Some embodiments of the present disclosure further provide a computer readable storage medium storing therein a program, where the program is executed by a processor, to implement steps of the foregoing measurement configuration method.

DETAILED DESCRIPTION

In order to make the technical problem to be solved, the technical solutions and advantages of the present disclosure clearer, the present disclosure will be described in detail below with reference to the drawings and specific embodiments.

To solve the problem of related art that when the PDCCH detection and the paging signal reception are implemented by using the WUS to achieve power saving, if the conventional measurement requirements are followed, then a power saving effect may not be achieved or may be insignificant, the present disclosure provides a measurement method, a measurement configuration method, a UE and a base station.

Figure 2:
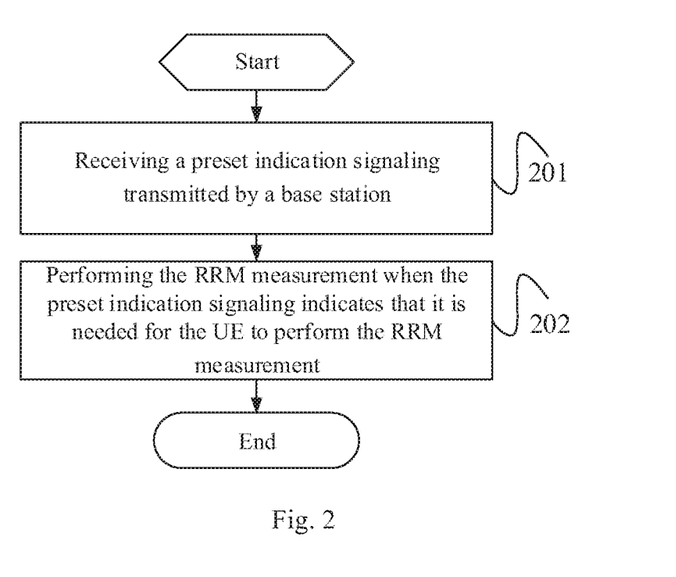
FIG. 2 illustrates a flow diagram of a measurement method according to an embodiments of the present disclosure.

As shown in FIG. 2, an embodiments of the present disclosure provides a measurement method. The measurement method is applied to a UE and includes step 201 to step 202.

The step 201 includes: receiving a preset indication signaling transmitted by a base station.

The preset indication signaling is configured to indicate whether it is needed for UE to perform RRM measurement.

It is noted, the preset indication signaling includes at least one of: a prior indication signaling, a wake-up signaling (WUS) or a go to sleep signaling (GTS). The prior indication signaling is newly added signaling in the present disclosure. The WUS and the GTS are conventional signalings with newly provided functions.

The step 202 includes: performing the RRM measurement when the preset indication signaling indicates that it is needed for the UE to perform the RRM measurement.

According to the present disclosure, by performing the RRM measurement when the received preset indication signaling indicates that it is needed for the UE to perform the RRM measurement, the problem that a large measurement overhead may occur in the PDCCH detection and paging reception is solved, thereby effectively reducing power consumption of UE.

Optionally, the RRM measurement includes: RRM measurement of a current cell and/or RRM measurement of a to-be-measured target cell; where the target cell is a neighboring cell of the current cell and/or a cell at a frequency different from a frequency of the current cell; the current cell is a camp cell or serving cell of the UE.

It is noted, when the UE is in an idle or inactive state, the cell which the UE is accessing is a camp cell of the UE, and when the UE is in a connected state, the cell which the UE is accessing is a serving cell. Since UE may only in a single state in any time, i.e., in an idle state (or inactive state) or a connected state, the current cell of the UE is either a camp cell or a serving cell in a single time.

It is further noted, when the RRM measurement includes the RRM measurement of the current cell and the RRM measurement of the to-be-measured target cell, a same field in the preset indication signaling is used to indicate whether it is needed to perform the RRM measurement of the current cell and whether it is needed to perform the RRM measurement of the to-be-measured target cell, or different fields in the preset indication signaling are used to indicate whether it is needed to perform the RRM measurement of the current cell and whether it is needed to perform the RRM measurement of the to-be-measured target cell.

In general, a preset quantity of bits (e.g., one bit) are used to indicate the RRM measurement. When a same field is used to indicate whether it is needed to perform the RRM measurement of the current cell and whether it is needed to perform the RRM measurement of the to-be-measured target cell, one bit in the field is used to indicate whether it is needed to perform the RRM measurement of the current cell and whether it is needed to perform the RRM measurement of the to-be-measured target cell. The one bit being 1 represents it is needed to perform the RRM measurement of the current cell and the RRM measurement of the to-be-measured target cell simultaneously; the one bit being 0 represents it is not needed to perform the RRM measurement of the current cell and the RRM measurement of the to-be-measured target cell. When different fields are used to make indication as to the RRM measurement, each of the indication as to whether it is needed to perform the RRM measurement of the current cell and the indication as to whether it is needed to perform the RRM measurement of the to-be-measured target cell uses one bit separately. For example, one bit at a preset position of a first field being 0 represents it is not needed to perform the RRM measurement of the current cell, and one bit at a preset position of a second field being 1 represents it is needed to perform the RRM measurement of the to-be-measured target cell.

It is further noted, the RRM measurement includes a cell-level RRM measurement and/or a beam-level RRM measurement.

Here, it is noted, the preset indication signaling is configured for the UE, or the preset indication signaling is configured for a group of UEs to which the UE belongs. In other words, the preset indication signaling may be transmitted to each UE separately, i.e., each UE receives a different preset indication signaling; the preset indication signaling may be transmitted to a group of UEs, i.e., the preset indication signalings received by the UEs belonging to the same group are the same.

Further, an implementation of the step 201 is as follows: receiving the preset indication signaling transmitted by the base station at a preset position; where the preset position is a preset fixed position (i.e., a position specified by protocol, and the preset position may be considered as an absolute position), or the preset position is a position having a preset time domain offset and/or preset frequency domain offset from a preset signaling (i.e., the preset position is a relative position); where the preset signaling includes at least one of: a periodic reference signaling, a prior indication signaling, a wake-up signaling (WUS), a go to sleep signaling (GTS) or a paging message.

Optionally, the preset indication signaling may further be configured to indicate whether it is needed for the UE to perform a physical downlink control channel (PDCCH) monitoring. In this case, the measurement method further includes: monitoring a PDCCH when the preset indication signaling indicates that it is needed for the UE to perform the PDCCH monitoring.

Optionally, a same field in the preset indication signaling is used to indicate whether it is needed to perform the RRM measurement and whether it is needed to perform the PDCCH monitoring, or different fields in the preset indication signaling are used to indicate whether it is needed to perform the RRM measurement and whether it is needed to perform the PDCCH monitoring.

In general, a preset quantity of bits (e.g., one bit) are used to indicate the RRM measurement and the PDCCH monitoring. When a same field is used to indicate whether it is needed to perform the RRM measurement and whether it is needed to perform the PDCCH monitoring, one bit in the field is used to indicate whether it is needed to perform the RRM measurement and whether it is needed to perform the PDCCH monitoring. The one bit being 1 represents it is needed to perform the RRM measurement and the PDCCH monitoring simultaneously; the one bit being 0 represents it is not needed to perform the RRM measurement and the PDCCH monitoring. When different fields are used to make indication as to the RRM measurement, each of the indication as to whether it is needed to perform the RRM measurement and the indication as to whether it is needed to perform the PDCCH monitoring uses one bit separately. For example, one bit at a preset position of a first field being 0 represents it is not needed to perform the RRM measurement, and one bit at a preset position of a second field being 1 represents it is needed to perform the PDCCH monitoring.

Optionally, after the monitoring the PDCCH, the method further includes: determining whether it is needed to receive a paging message according to indication information carried in the PDCCH.

When it is needed to receive the paging message, the UE receives the paging message at a corresponding resource position.

Optionally, the preset indication signaling is further configured to indicate whether it is needed for the UE to perform a PDCCH monitoring and a paging message reception. In this case, the measurement method further includes: monitoring a PDCCH and receiving a paging message when the preset indication signaling indicates that it is needed for the UE to perform the PDCCH monitoring and the paging message reception.

Further, a same field in the preset indication signaling is used to indicate whether it is needed to perform the RRM measurement and whether it is needed to perform the PDCCH monitoring and the paging message reception, or different fields in the preset indication signaling are used to indicate whether it is needed to perform the RRM measurement and whether it is needed to perform the PDCCH monitoring and the paging message reception.

In general, a preset quantity of bits (e.g., one bit) are used to indicate the RRM measurement, the PDCCH monitoring and the paging message reception. When a same field is used to indicate whether it is needed to perform the RRM measurement and whether it is needed to perform the PDCCH monitoring and the paging message reception, one bit in the field is used to indicate whether it is needed to perform the RRM measurement and whether it is needed to perform the PDCCH monitoring and the paging message reception. The one bit being 1 represents it is needed to perform the RRM measurement and the PDCCH monitoring and the paging message reception simultaneously; the one bit being 0 represents it is not needed to perform the RRM measurement and the PDCCH monitoring and the paging message reception. When different fields are used to make indication as to the RRM measurement, each of the indication as to whether it is needed to perform the RRM measurement and the indication as to whether it is needed to perform the PDCCH monitoring and the paging message reception uses one bit separately. For example, one bit at a preset position of a first field being 0 represents it is not needed to perform the RRM measurement, and one bit at a preset position of a second field being 1 represents it is needed to perform the PDCCH monitoring and the paging message reception.

Optionally, a specific implementation of the step of performing the RRM measurement is as follows: performing the RRM measurement by monitoring a preset reference signaling in a preset time interval; where the preset time interval is determined by a preset rule or is configured and transmitted by the base station to the UE.

It is noted, the preset time interval may be predetermined by protocol (i.e., determined by a preset rule), or may be informed by network (i.e., configured and transmitted by the base station). For example, the preset time interval includes an L1 or L3 sampling interval of the RRM measurement of the current cell, or several sampling intervals.

The preset reference signaling includes at least one of: a synchronization reference signaling, a channel state information reference signal (CSI-RS), a prior indication signaling, a wake-up signaling (WUS) or a go to sleep signaling (GTS).

It is noted, the aforementioned RRM measurement includes two modes of measurement: a first mode is measurement based on reference signal, i.e., measurement based on synchronization signal block (SS block) and/or CSI-RS; a second mode is measurement based on a preset indication signaling, i.e., measurement based on at least one of a prior indication signaling, a wake-up signaling (WUS) or a go to sleep signaling (GTS).

Optionally, when the RRM measurement includes the RRM measurement of the current cell, the performing the RRM measurement includes: acquiring a state parameter of the UE, where it is noted that the state parameter includes at least one of: a type of the UE, an environment where the UE is located, mobility status information of the UE, service status information of the UE or signal coverage information of a location of the UE, and it is further noted that the state parameter may be detected by a sensor on the UE; determining whether it is needed to perform the RRM measurement of the current cell according to the state parameter of the UE; performing the RRM measurement of the current cell when it is determined that it is needed to perform the RRM measurement of the current cell.

Optionally, when RRM measurement of the current cell is performed, measurement based on the reference signal may be performed, and measurement based on the preset indication signaling may be performed as well.

Optionally, the UE may further transmit the state parameter to the base station; and the base station may derive a preset indication signaling indicating whether it is needed for the UE to perform the RRM measurement according to the received state parameter of the UE or state parameter of the UE estimated by the base station itself, and then transmit the preset indication signaling to the UE.

Optionally, when the RRM measurement includes the RRM measurement of the to-be-measured target cell, before the performing the RRM measurement, the method further includes: acquiring information of the to-be-measured target cell; where the target cell is configured by the base station for the UE or for a group to which the UE belongs.

Optionally, an implementation of acquiring information of the to-be-measured target cell is as follows: receiving the information of the target cell transmitted by the base station by means of a preset message; where the preset message is a system broadcast message (including a system message and a broadcast message) or a radio resource control (RRC) message.

It is noted, the base station may acquire information of the target cell to be measured by the UE in advance, and then transmit the information the UE. The UE measures the target cell according to the information.

Optionally, another implementation of acquiring information of the to-be-measured target cell is as follows: receiving the information of the target cell transmitted by the base station by means of a preset message; determining, according to a state parameter of the UE, information of the to-be-measured target cell from the information of the target cell transmitted by the base station.

It is noted, the base station may acquire information of the target cell to be measured by the UE in advance, and then transmit the information to the UE. Having received the information, the UE selects information of a target cell to be measured finally from the information and performs measurement of the target cell according to the selected information, instead of performing the measurement based on the information directly.

Here, it is further noted, information of the target cell transmitted by the base station may be transmitted to each UE, or may be transmitted to a group of UE, that is, information of the target cell received by each UE belonging to a same group of UE is the same.

In specific, UE may employ any one of the following approach 1 and approach 2 to perform the RRM measurement of the to-be-measured target cell.

Approach 1

It is determined whether a trigger condition of a target cell measurement is met.

It is noted, the trigger condition may be a trigger condition as originally defined in LTE, i.e., the measurement is triggered once the signal reception performance of the current cell drops below a threshold. The trigger condition may also be a trigger condition defined according to a UE state. That is, the base station may configure for the UE measurement requirements under an appropriate mode according to parameters of the UE such as mobility status; or determine whether to perform measurement in a connected state (RRM measurement) and/or measurement in an idle state (such as measurement while camping) according to a type of UE, an environment where the UE is located, mobility status of the UE, coverage status, state detected by a sensor of the UE, service status of the UE and the like.

In case that the trigger condition is met, the RRM measurement is performed on the target cell meeting the trigger condition.

A specific application process of the approach 1 is as follows: when a trigger condition of target cell measurement is met, the UE determines whether to measure the target cell according to the preset indication signaling. If the trigger condition of target cell measurement is met, and the UE receives a preset indication signaling indicating that it is needed to perform the measurement, the UE performs RRM measurement by monitoring RRM reference signal (such as SS block and/or CSI-RS) of the target cell in a set time interval; otherwise, the UE does not perform the RRM measurement of the target cell in the set time interval. The set time interval may be informed by network, or may be determined by protocol, e.g., the time interval is an L1 or L3 sampling interval of neighboring cell RRM measurement.

Approach 2

It is determined whether a trigger condition of a target cell measurement is met and whether a state parameter of the UE allows measurement of the target cell.

In case that the trigger condition is met and the state parameter of the UE allows the measurement of the target cell, the RRM measurement is performed on the target cell for which the trigger condition is met and the measurement is allowed by the state parameter of the UE.

A specific application process of the approach 2 is as follows: when a trigger condition of target cell measurement is met, and it is determined according to the preset indication signaling that it is needed to perform RRM measurement of the target cell, the UE further determines whether to perform the RRM measurement on the target cell according to the state parameter of the UE. If it is determined that it is needed to perform the RRM measurement on the target cell, the UE performs RRM measurement by monitoring RRM reference signal (such as SS block and/or CSI-RS) of the target cell in a set time interval; otherwise, the UE does not perform the RRM measurement of neighboring cell in the set time interval. The set time interval may be informed by network, or may be determined by protocol, e.g., the time interval is an L1 or L3 sampling interval of neighboring cell RRM measurement.

According to the embodiments of the present disclosure, a measurement process is initiated according to the preset indication signaling, so as to prevent the UE from making measurement blindly, thereby reducing the measurement overhead and power consumption of UE.

Figure 3:
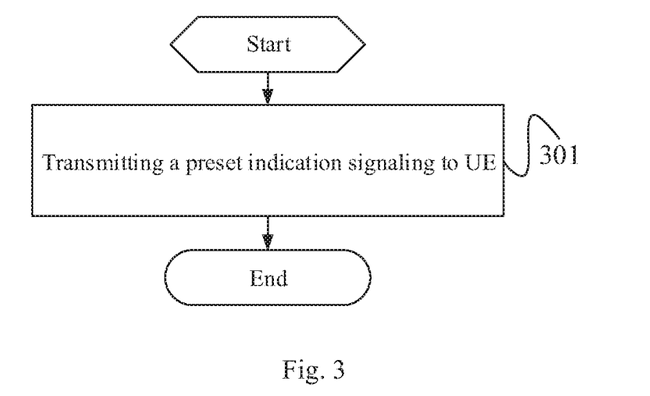
FIG. 3 illustrates a flow diagram of a measurement configuration method according to an embodiments of the present disclosure.

As shown in FIG. 3, an embodiments of the present disclosure further provides a measurement configuration method. The measurement configuration method is applied to a base station and includes following step.

A step 301 includes: transmitting a preset indication signaling to UE.

The preset indication signaling is configured to indicate whether the UE is to perform RRM measurement.

Further, in a specific implementation, the step 301 includes: acquiring a state parameter of the UE; acquiring the preset indication signaling according to the state parameter; transmitting the preset indication signaling to the UE.

Further, the acquiring the state parameter of the UE includes: receiving a state parameter reported by the UE.

Optionally, the state parameter includes at least one of: a type of the UE, an environment where the UE is located, mobility status information of the UE, service status information of the UE or signal coverage information of a location of the UE.

Optionally, the preset indication signaling includes at least one of: a prior indication signaling, a wake-up signaling (WUS) or a go to sleep signaling (GTS).

Further, the transmitting the preset indication signaling to the UE includes: transmitting the preset indication signaling to the UE at a preset position; where the preset position is a preset fixed position, or the preset position is a position having a preset time domain offset and/or preset frequency domain offset from a preset signaling; where the preset signaling includes at least one of: a periodic reference signaling, a prior indication signaling, a wake-up signaling (WUS), a go to sleep signaling (GTS) or a paging message.

Further, after the transmitting the preset indication signaling to the UE, the method further includes: transmitting information of a target cell to the UE; where the target cell is a neighboring cell of a current cell and/or a cell at a frequency different from a frequency of the current cell.

The current cell is a camp cell or serving cell of the UE.

Further, the transmitting the information of the target cell to the UE includes: transmitting the information of the target cell to the UE by means of a preset message; where the preset message is a system broadcast message or a radio resource control (RRC) message.

Optionally, the preset indication signaling is configured for the UE, or the preset indication signaling is configured for a group of UEs to which the UE belongs.

It is noted, all descriptions related to the base station side in the foregoing embodiments are applicable to embodiments of the measurement configuration method applied to the base station side, and may achieve the same technical effects.

Figure 4:
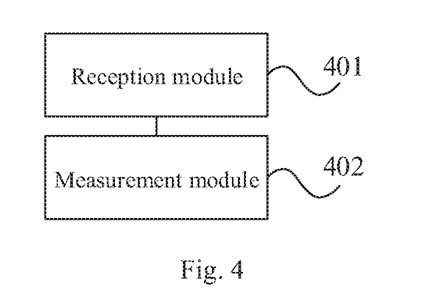
FIG. 4 illustrates a schematic module diagram of a UE according to an embodiments of the present disclosure.

As shown in FIG. 4, an embodiments of the present disclosure provides a UE. The UE includes: a reception module 401, configured to receive a preset indication signaling transmitted by a base station, where the preset indication signaling is configured to indicate whether it is needed for the UE to perform RRM measurement; a measurement module 402, configured to perform the RRM measurement when the preset indication signaling indicates that it is needed for the UE to perform the RRM measurement.

Optionally, the RRM measurement includes: RRM measurement of a current cell and/or RRM measurement of a to-be-measured target cell; where the target cell is a neighboring cell of the current cell and/or a cell at a frequency different from a frequency of the current cell; the current cell is a camp cell or serving cell of the UE.

Optionally, when the RRM measurement includes the RRM measurement of the current cell and the RRM measurement of the to-be-measured target cell, a same field in the preset indication signaling is used to indicate whether it is needed to perform the RRM measurement of the current cell and whether it is needed to perform the RRM measurement of the to-be-measured target cell, or different fields in the preset indication signaling are used to indicate whether it is needed to perform the RRM measurement of the current cell and whether it is needed to perform the RRM measurement of the to-be-measured target cell.

Optionally, the preset indication signaling includes at least one of: a prior indication signaling, a wake-up signaling (WUS) or a go to sleep signaling (GTS).

Further, the reception module 401 is configured to: receive the preset indication signaling transmitted by the base station at a preset position; where the preset position is a preset fixed position, or the preset position is a position having a preset time domain offset and/or preset frequency domain offset from a preset signaling; where the preset signaling includes at least one of: a periodic reference signaling, a prior indication signaling, a wake-up signaling (WUS), a go to sleep signaling (GTS) or a paging message.

Optionally, the preset indication signaling is further configured to indicate whether it is needed for the UE to perform a physical downlink control channel (PDCCH) monitoring, and the UE further includes: a monitoring module, configured to monitor a PDCCH when the preset indication signaling indicates that it is needed for the UE to perform the PDCCH monitoring.

Optionally, a same field in the preset indication signaling is used to indicate whether it is needed to perform the RRM measurement and whether it is needed to perform the PDCCH monitoring, or different fields in the preset indication signaling are used to indicate whether it is needed to perform the RRM measurement and whether it is needed to perform the PDCCH monitoring.

Further, the UE further includes: a determination module, configured to determine whether it is needed to receive a paging message according to indication information carried in the PDCCH.

Further, the preset indication signaling is further configured to indicate whether it is needed for the UE to perform a PDCCH monitoring and a paging message reception, and the UE further includes: a monitoring and reception module, configured to monitor a PDCCH and receive a paging message when the preset indication signaling indicates that it is needed for the UE to perform the PDCCH monitoring and the paging message reception.

Optionally, a same field in the preset indication signaling is used to indicate whether it is needed to perform the RRM measurement and whether it is needed to perform the PDCCH monitoring and the paging message reception, or different fields in the preset indication signaling are used to indicate whether it is needed to perform the RRM measurement and whether it is needed to perform the PDCCH monitoring and the paging message reception.

Further, the measurement module 402 is configured to: perform the RRM measurement by monitoring a preset reference signaling in a preset time interval; where the preset time interval is determined by a preset rule or is configured and transmitted by the base station to the UE; the preset reference signaling includes at least one of: a synchronization reference signaling, a channel state information reference signaling (CSI-RS), a prior indication signaling, a wake-up signaling (WUS) or a go to sleep signaling (GTS).

Optionally, when the RRM measurement includes the RRM measurement of the current cell, the measurement module includes: a first acquisition unit, configured to acquire a state parameter of the UE; a first determination unit, configured to determine whether it is needed to perform the RRM measurement of the current cell according to the state parameter of the UE; a first measurement unit, configured to perform the RRM measurement of the current cell when it is determined that it is needed to perform the RRM measurement of the current cell.

Further, the UE further includes: a first transmission module, configured to transmit the state parameter of the UE to the base station, such that the base station transmits the preset indication signaling according to the state parameter.

Further, when the RRM measurement includes the RRM measurement of the to-be-measured target cell, the UE further includes: an acquisition module, configured to acquire information of the to-be-measured target cell; where the target cell is configured by the base station for the UE or for a group to which the UE belongs.

Further, the acquisition module includes: a first reception unit, configured to receive the information of the target cell transmitted by the base station by means of a preset message; where the preset message is a system broadcast message or a radio resource control (RRC) message.

Further, the acquisition module includes: a second reception unit, configured to receive the information of the target cell transmitted by the base station by means of a preset message; a second determination unit, configured to determine, according to a state parameter of the UE, information of the to-be-measured target cell from the information of the target cell transmitted by the base station.

Further, the measurement module 402 includes: a first determination unit, configured to determine whether a trigger condition of a target cell measurement is met; a second measurement unit, configured to perform, in case that the trigger condition is met, the RRM measurement on the target cell meeting the trigger condition.

Further, the measurement module 402 includes: a second determination unit, configured to determine whether a trigger condition of a target cell measurement is met and whether a state parameter of the UE allows measurement of the target cell; a third measurement unit, configured to perform, in case that the trigger condition is met and the state parameter of the UE allows the measurement of the target cell, the RRM measurement on the target cell for which the trigger condition is met and the measurement is allowed by the state parameter of the UE.

Optionally, the state parameter includes at least one of: a type of the UE, an environment where the UE is located, mobility status information of the UE, service status information of the UE or signal coverage information of a location of the UE.

Optionally, the RRM measurement includes a cell-level RRM measurement and/or a beam-level RRM measurement.

Optionally, the preset indication signaling is configured for the UE, or the preset indication signaling is configured for a group of UEs to which the UE belongs.

It is noted, the UE is a UE corresponding to the foregoing measurement method applied to a UE side, all implementations of the foregoing embodiments are applicable to the UE and may achieve the same technical effects.

Some embodiments of the present disclosure further provide a UE. The UE includes a memory, a processor and a computer program stored in the memory and configured to be executed by the processor, where the processor is configured to execute the computer program, to implement various processes of the foregoing embodiment of measurement method applied to a UE side, and achieve the same technical effects. To avoid redundancy, a repeated description is omitted herein.

Some embodiments of the present disclosure further provide a computer readable storage medium. The computer readable storage medium stores a computer program therein, and the computer program is configured to be executed by a processor, to implement various processes of the foregoing embodiment of measurement method applied to a UE side, and achieve the same technical effects. To avoid redundancy, a repeated description is omitted herein. The computer readable storage medium includes read-only memory (ROM), random access memory (RAM), magnetic disk, optical disc or the like.

Figure 5:
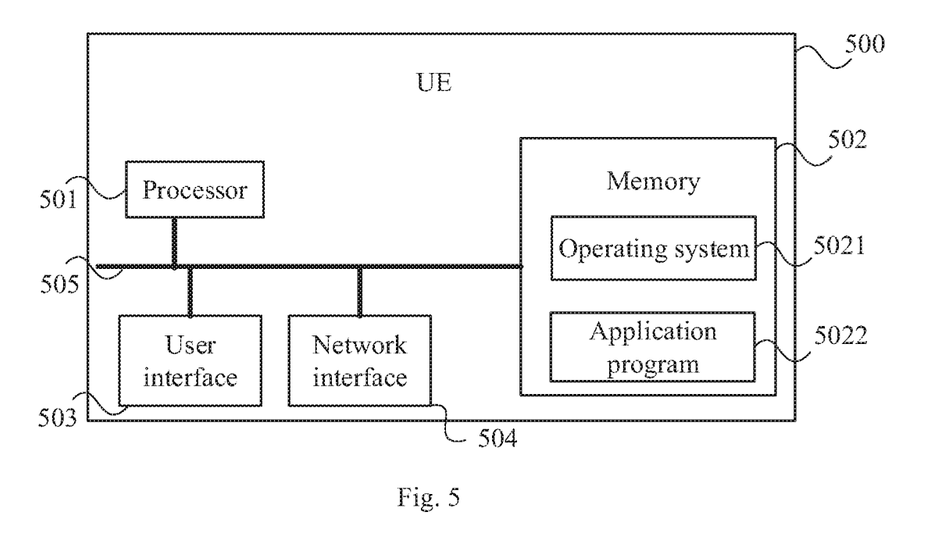
FIG. 5 illustrates a structural block diagram of a UE according to an embodiments of the present disclosure.

As shown in FIG. 5, a structural block diagram of UE according to an embodiment of the present disclosure is illustrated. An application entity of the measurement method according to the present disclosure is described in detail with reference to the drawing hereinafter.

As shown in FIG. 5, a UE 500 includes: at least one processor 501, a memory 502, at least one network interface 504 and a user interface 503. The various components in the UE 500 are coupled together by a bus system 505. It will be appreciated that the bus system 505 is configured to enable connection and communication between these components. The bus system 505 includes a power bus, a control bus, and a status signal bus in addition to a data bus. However, for clarity of description, various buses are all labeled as the bus system 505 in FIG. 5.

The user interface 503 may include a display, a keyboard, a point-and-click device (e.g., a mouse, a track ball), a touchpad or a touch screen, etc.

It is to be understood that the storage 502 in the embodiment of the present disclosure may be a volatile or non-volatile memory, or may include both. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 502 of the systems and methods described herein is intended to include, but is not limited to, these and any other suitable types of storages.

In some implementations, the memory 502 stores the following elements: executable modules or data structures, or a subset or extended set thereof, such as an operating system 5021 and an application program 5022.

The operating system 5021 includes various system programs, such as a framework layer program, a core library layer program and a driver layer program, to implement various basic services and process hardware-based tasks. The application program 5022 includes various application programs, such as a media player and a browser, to implement various application services. A program implementing the methods of the embodiments of the present disclosure may be included in the application program 5022.

In the embodiments of the present disclosure, the UE 500 further includes: a computer program stored in the memory 502 and executable by the processor 501, and specifically, the computer program may be a computer program in the application program 5022. The computer program is configured to be executed by the processor 501, to implement the following step: receiving a preset indication signaling transmitted by a base station, where the preset indication signaling is configured to indicate whether it is needed for the UE to perform RRM measurement; performing the RRM measurement when the preset indication signaling indicates that it is needed for the UE to perform the RRM measurement.

The method disclosed in the embodiments of the present disclosure may be applied to the processor 501 or implemented by the processor 501. The processor 501 may be an integrated circuit chip having a signal processing capability. During an implementation process, steps of the methods may be realized in the processor 501 in form of hardware by integrated logical circuits or in form of software by instructions. The processor 501 may be a general purpose processor, digital signal processor (DSP), application specific integrated circuit (ASIC), field programmable gate array (FPGA) or other programmable logic device, discrete gate or transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may camp in well-established computer readable storage medium in the art, such as a RAM, flash memory, ROM, PROM or EEPROM, register. The computer readable storage medium resides in the memory 502. The processor 501 reads information from the memory 502 and performs the steps of the methods with its hardware. Specifically, the computer readable storage medium stores a computer program, and the computer program is configured to be executed by the processor 501 to implement following steps.

It is understood, the embodiments described in the present disclosure may be implemented by hardware, software, firmware, middleware, microcode or a combination thereof. For hardware implementation, processing units may be implemented in one or more application specific integrated circuits (ASICs), digital signal processor (DSP), DSP device (DSPD), programmable logic device (PLD), field programmable gate array (FPGA), general purpose processor, controller, microcontroller, microprocessor, other electronic unit configured to perform the function described in this application or a combination thereof.

For software implementation, the techniques described herein may be implemented by a module (e.g., process, function, etc.) configured to perform the functionalities described herein. Software code may be stored in a storage and executed by the processor. The storage may be implemented internal or external to the processor.

Optionally, the RRM measurement includes: RRM measurement of a current cell and/or RRM measurement of a to-be-measured target cell; where the target cell is a neighboring cell of the current cell and/or a cell at a frequency different from a frequency of the current cell; the current cell is a camp cell or serving cell of the UE.

Optionally, when the RRM measurement includes the RRM measurement of the current cell and the RRM measurement of the to-be-measured target cell, a same field in the preset indication signaling is used to indicate whether it is needed to perform the RRM measurement of the current cell and whether it is needed to perform the RRM measurement of the to-be-measured target cell, or different fields in the preset indication signaling are used to indicate whether it is needed to perform the RRM measurement of the current cell and whether it is needed to perform the RRM measurement of the to-be-measured target cell.

Optionally, the preset indication signaling includes at least one of: a prior indication signaling, a wake-up signaling (WUS) or a go to sleep signaling (GTS).

Optionally, the computer program is configured to be executed by the processor 501 to implement following step: receiving the preset indication signaling transmitted by the base station at a preset position; where the preset position is a preset fixed position, or the preset position is a position having a preset time domain offset and/or preset frequency domain offset from a preset signaling; where the preset signaling includes at least one of: a periodic reference signaling, a prior indication signaling, a wake-up signaling (WUS), a go to sleep signaling (GTS) or a paging message.

Optionally, the preset indication signaling is further configured to indicate whether it is needed for the UE to perform a physical downlink control channel (PDCCH) monitoring, and the computer program is configured to be executed by the processor 501 to implement following step: monitoring a PDCCH when the preset indication signaling indicates that it is needed for the UE to perform the PDCCH monitoring.

Optionally, a same field in the preset indication signaling is used to indicate whether it is needed to perform the RRM measurement and whether it is needed to perform the PDCCH monitoring, or different fields in the preset indication signaling are used to indicate whether it is needed to perform the RRM measurement and whether it is needed to perform the PDCCH monitoring.

Optionally, the computer program is configured to be executed by the processor 501 to implement following step: determining whether it is needed to receive a paging message according to indication information carried in the PDCCH.

Optionally, the preset indication signaling is further configured to indicate whether it is needed for the UE to perform a PDCCH monitoring and a paging message reception, and the computer program is configured to be executed by the processor 501 to implement following step: monitoring a PDCCH and receiving a paging message when the preset indication signaling indicates that it is needed for the UE to perform the PDCCH monitoring and the paging message reception.

Optionally, a same field in the preset indication signaling is used to indicate whether it is needed to perform the RRM measurement and whether it is needed to perform the PDCCH monitoring and the paging message reception, or different fields in the preset indication signaling are used to indicate whether it is needed to perform the RRM measurement and whether it is needed to perform the PDCCH monitoring and the paging message reception.

Optionally, the computer program is configured to be executed by the processor 501 to implement following step: performing the RRM measurement by monitoring a preset reference signaling in a preset time interval; where the preset time interval is determined by a preset rule or is configured and transmitted by the base station to the UE; the preset reference signaling includes at least one of: a synchronization reference signaling, a channel state information reference signal (CSI-RS), a prior indication signaling, a wake-up signaling (WUS) or a go to sleep signaling (GTS).

Optionally, the computer program is configured to be executed by the processor 501 to implement following steps: acquiring a state parameter of the UE; determining whether it is needed to perform the RRM measurement of the current cell according to the state parameter of the UE; performing the RRM measurement of the current cell when it is determined that it is needed to perform the RRM measurement of the current cell.

Optionally, the computer program is configured to be executed by the processor 501 to implement following step: transmitting the state parameter of the UE to the base station, wherein the state parameter is used to transmit the preset indication signaling by the base station according to the state parameter.

Optionally, when the RRM measurement includes the RRM measurement of the to-be-measured target cell, the computer program is configured to be executed by the processor 501 to implement the measurement.

Optionally, the computer program is configured to be executed by the processor 501 to implement following step: acquiring information of the to-be-measured target cell; where the target cell is configured by the base station for the UE or for a group to which the UE belongs.

Optionally, the computer program is configured to be executed by the processor 501 to implement following step: receiving the information of the target cell transmitted by the base station by means of a preset message; where the preset message is a system broadcast message or a radio resource control (RRC) message.

Optionally, the computer program is configured to be executed by the processor 501 to implement following steps: receiving the information of the target cell transmitted by the base station by means of a preset message; determining, according to a state parameter of the UE, information of the to-be-measured target cell from the information of the target cell transmitted by the base station.

Optionally, the computer program is configured to be executed by the processor 501 to implement following steps: determining whether a trigger condition of a target cell measurement is met; performing, in case that the trigger condition is met, the RRM measurement on the target cell meeting the trigger condition.

Optionally, the computer program is configured to be executed by the processor 501 to implement following steps: determining whether a trigger condition of a target cell measurement is met and whether a state parameter of the UE allows measurement of the target cell; performing, in case that the trigger condition is met and the state parameter of the UE allows the measurement of the target cell, the RRM measurement on the target cell for which the trigger condition is met and the measurement is allowed by the state parameter of the UE.

Optionally, the state parameter includes at least one of: a type of the UE, an environment where the UE is located, mobility status information of the UE, service status information of the UE or signal coverage information of a location of the UE.

Optionally, the RRM measurement includes a cell-level RRM measurement and/or a beam-level RRM measurement.

Optionally, the preset indication signaling is configured for the UE, or the preset indication signaling is configured for a group of UEs to which the UE belongs.

The UE 500 may implement various processes implemented by the UE according to the foregoing embodiment. To avoid redundancy, a repeated description is omitted herein.

According to the UE of the embodiment of present disclosure, by receiving a preset indication signaling transmitted by a base station, where the preset indication signaling is configured to indicate whether it is needed for the UE to perform RRM measurement; and performing the RRM measurement when the preset indication signaling indicates that it is needed for the UE to perform the RRM measurement, the problem that a large measurement overhead may occur in the PDCCH detection and paging reception is solved, thereby effectively reducing power consumption of UE.

Figure 6:
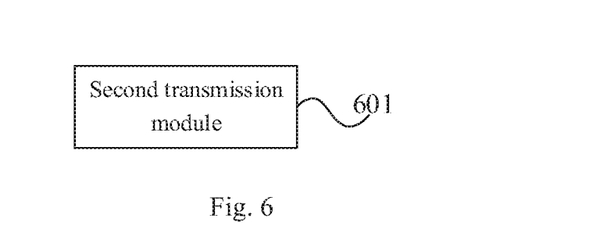
FIG. 6 illustrates a schematic module diagram of a base station according to an embodiments of the present disclosure.

As shown in FIG. 6, an embodiment of the present disclosure further provides a base station. The base station includes: a second transmission module 601, configured to transmit a preset indication signaling to UE; where the preset indication signaling is configured to indicate whether the UE is to perform RRM measurement.

Further, the second transmission module 601 includes: a second acquisition unit, configured to acquire a state parameter of the UE; a third acquisition unit, configured to acquire the preset indication signaling according to the state parameter, a transmission unit, configured to transmit the preset indication signaling to the UE.

Further, the second acquisition unit is configured to: receive a state parameter reported by the UE.

Optionally, the state parameter includes at least one of: a type of the UE, an environment where the UE is located, mobility status information of the UE, service status information of the UE or signal coverage information of a location of the UE.

Optionally, the preset indication signaling includes at least one of: a prior indication signaling, a wake-up signaling (WUS) or a go to sleep signaling (GTS).

Further, the second transmission module is configured to: transmit the preset indication signaling to the UE at a preset position; where the preset position is a preset fixed position, or the preset position is a position having a preset time domain offset and/or preset frequency domain offset from a preset signaling; where the preset signaling includes at least one of: a periodic reference signaling, a prior indication signaling, a wake-up signaling (WUS), a go to sleep signaling (GTS) or a paging message.

Further, the base station further includes: a third transmission module, configured to transmit information of a target cell to the UE: where the target cell is a neighboring cell of a current cell and/or a cell at a frequency different from a frequency of the current cell; the current cell is a camp cell or serving cell of the UE.

Optionally, the third transmission module is configured to: transmit the information of the target cell to the UE by means of a preset message; where the preset message is a system broadcast message or a radio resource control (RRC) message.

Optionally, the preset indication signaling is configured for the UE, or the preset indication signaling is configured for a group of UEs to which the UE belongs.

It is noted, the base station embodiment is a base station corresponding to the foregoing measurement configuration method applied to a base station side, all implementations of the foregoing embodiments are applicable to the base station embodiment and may achieve the same technical effects.

Some embodiments of the present disclosure further provide a base station. The base station includes a memory, a processor and a computer program stored in the memory and configured to be executed by the processor, where the processor is configured to execute the computer program, to implement various processes of the foregoing embodiment of measurement configuration method applied to a base station side, and achieve the same technical effects. To avoid redundancy, a repeated description is omitted herein.

Some embodiments of the present disclosure further provide a computer readable storage medium. The computer readable storage medium stores a computer program therein, and the computer program is configured to be executed by a processor, to implement various processes of the foregoing embodiment of measurement configuration method applied to a base station side, and achieve the same technical effects. To avoid redundancy, a repeated description is omitted herein. The computer readable storage medium includes read-only memory (ROM), random access memory (RAM), magnetic disk, optical disc or the like.

Figure 7:
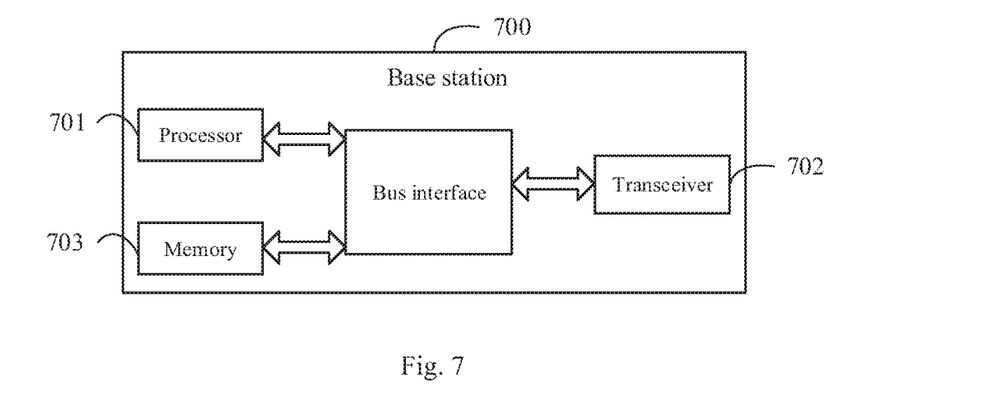
FIG. 7 illustrates a structural block diagram of a base station according to an embodiments of the present disclosure.

FIG. 7 is a structural diagram of a base station according to an embodiment of the present disclosure. The base station is capable of implementing details of the foregoing measurement configuration method applied to a base station side, and achieving the same effects. As shown in FIG. 7, the base station 700 includes: a processor 701, a transceiver 702, a memory 703 and a bus interface, where the processor 701 is configured to read a program in the memory 703 to implement following process: transmitting a preset indication signaling to UE through the transceiver 702; where the preset indication signaling is configured to indicate whether the UE is to perform RRM measurement.

In FIG. 7, a bus architecture may include any number of interconnected buses and bridges, and connects various circuits including one or more processors represented by the processor 701 and storages represented by the storage 703. The bus architecture may also connect various other circuits such as peripherals, voltage regulators and power management circuits, which is well known in the art. Therefore, a detailed description thereof is omitted herein. A bus interface provides interfaces. The transceiver 702 may include multiple elements, such as a transmitter and a receiver, to allow for communication with various other apparatuses on the transmission medium.

The processor 701 is responsible for supervising the bus architecture and normal operation, and the memory 703 may store the data being used by the processor 701 during operation.

Optionally, the processor 701 is configured to read a program in the memory 703 to implement following steps: acquiring a state parameter of the UE; acquiring the preset indication signaling according to the state parameter; transmitting the preset indication signaling to the UE through the transceiver 702.

Optionally, the processor 701 is configured to read a program in the memory 703 to implement following step: receiving a state parameter reported by the UE through the transceiver 702.

Optionally, the state parameter includes at least one of: a type of the UE, an environment where the UE is located, mobility status information of the UE, service status information of the UE or signal coverage information of a location of the UE.

Optionally, the preset indication signaling includes at least one of: a prior indication signaling, a wake-up signaling (WUS) or a go to sleep signaling (GTS).

Optionally, the processor 701 is configured to read a program in the memory 703 to implement following step: transmitting the preset indication signaling to the UE at a preset position; where the preset position is a preset fixed position, or the preset position is a position having a preset time domain offset and/or preset frequency domain offset from a preset signaling; where the preset signaling includes at least one of: a periodic reference signaling, a prior indication signaling, a wake-up signaling (WUS), a go to sleep signaling (GTS) or a paging message.

Optionally, the processor 701 is configured to read a program in the memory 703 to implement following step: transmitting information of a target cell to the UE; where the target cell is a neighboring cell of a current cell and/or a cell at a frequency different from a frequency of the current cell.

The current cell is a camp cell or serving cell of the UE.

Optionally, the processor 701 is configured to read a program in the memory 703 to implement following step: transmitting the information of the target cell to the UE by means of a preset message; where the preset message is a system broadcast message or a radio resource control (RRC) message.

Optionally, the preset indication signaling is configured for the UE, or the preset indication signaling is configured for a group of UEs to which the UE belongs.

According to the base station of the embodiment of present disclosure, by transmitting a preset indication signaling to indicate whether it is needed for the UE to initiate RRM measurement, the problem that a large measurement overhead may occur in the PDCCH detection and paging reception is solved, thereby effectively reducing power consumption of UE.

The embodiments provided in the specification are described in a progressive manner and the description of each embodiment focuses on its difference from other embodiments, thus the same or similar part among various embodiments may be referred with each other.

It is appreciated by a person skilled in the art that, embodiments of the present disclosure may be implemented as a method, device or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer readable storage media (including, but not limited to, a magnetic disk storage, CD-ROM, optical storage or the like) storing therein computer usable program codes.

The embodiments of the present disclosure have been described with reference to flow diagrams and/or block diagrams of methods, terminal devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which are executed via the processor of the computer or other programmable data processing terminal device, create means for implementing the functions specified in the flow diagram flow or flows and/or block diagram block or blocks.

These computer program instructions may also be stored in a computer-readable storage that can direct a computer or other programmable data processing terminal device to function in a particular manner, such that the instructions stored in the computer-readable storage produce an article of manufacture including instruction means which implement the function specified in the flow diagram flow or flows and/or block diagram block or blocks.

The computer program instructions may also be loaded onto a computer or other programmable data processing terminal device to cause a series of operational steps to be performed on the computer or other programmable terminal device to produce a computer-implemented process such that the instructions which are executed on the computer or other programmable terminal device provide steps for implementing the functions specified in the flow diagram flow or flows and/or block diagram block or blocks.

Although optional embodiments of the present disclosure have been described, a person skilled in the art, having the benefit of the basic creative concept, may make additional modifications or substitutions on the basis of these embodiments. Thus, the appended claims are intended to be construed as encompassing the optional embodiments and all modifications or substitutions falling within the scope of the embodiments of the present disclosure.

It is noted that, relational terms used here in, such as "first" and "second", are merely used to distinguish one entity or operation from another entity or operation, without requiring or implying any such an actual relation or sequence existing among these entities or operations. Moreover, "include", "have" and any variations thereof in the present disclosure are intended to cover a non-exclusive inclusion, such that a process, a method, an article, or a terminal device that includes a series of elements not only includes the series of elements, but also may include other elements not expressly listed or include elements inherent to the process, the method, the article, or the terminal device. Without further limitation, an element preceded by "includes or including" does not preclude existence of additional identical elements in the process, the method, the article, or the terminal device including the element.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A measurement method, comprising:
   receiving a preset indication signaling transmitted by a base station before blind-detection of a paging signal or PDCCH, wherein the preset indication signaling is configured to indicate whether it is needed for a user equipment (UE) to perform a radio resource management (RRM) measurement;
   performing the RRM measurement when the preset indication signaling indicates that it is needed for the UE to perform the RRM measurement.

2. The measurement method according to claim 1, wherein the RRM measurement comprises: RRM measurement of a current cell and/or RRM measurement of a to-be-measured target cell;
   wherein the target cell is a neighboring cell of the current cell and/or a cell at a frequency different from a frequency of the current cell;
   the current cell is a camp cell or a serving cell of the UE.

3. The measurement method according to claim 2, wherein
   when the RRM measurement comprises the RRM measurement of the current cell and the RRM measurement of the to-be-measured target cell, a same field in the preset indication signaling is used to indicate whether it is needed to perform the RRM measurement of the current cell and whether it is needed to perform the RRM measurement of the to-be-measured target cell, or different fields in the preset indication signaling are used to indicate whether it is needed to perform the RRM measurement of the current cell and whether it is needed to perform the RRM measurement of the to-be-measured target cell.

4. The measurement method according to claim 2, wherein the preset indication signaling comprises at least one of: a prior indication signaling, a wake-up signaling (WUS) or a go to sleep signaling (GTS).

5. The measurement method according to claim 2, wherein the receiving the preset indication signaling transmitted by the base station comprises:
   receiving the preset indication signaling transmitted by the base station at a preset position;
   wherein the preset position is a preset fixed position, or the preset position is a position having a preset time domain offset and/or preset frequency domain offset from a preset signaling;
   wherein the preset signaling comprises at least one of: a periodic reference signaling, a prior indication signaling, a wake-up signaling (WUS), a go to sleep signaling (GTS) or a paging message.

6. The measurement method according to claim 2, wherein the preset indication signaling is further configured to indicate whether it is needed for the UE to perform a physical downlink control channel (PDCCH) monitoring, and the measurement method further comprises:
   monitoring a PDCCH when the preset indication signaling indicates that it is needed for the UE to perform the PDCCH monitoring.

7. The measurement method according to claim 6, wherein, after the monitoring the PDCCH, the method further comprises:
   determining whether it is needed to receive a paging message according to indication information carried in the PDCCH.

8. The measurement method according to claim 2, wherein the preset indication signaling is further configured to indicate whether it is needed for the UE to perform a PDCCH monitoring and a paging message reception, and the measurement method further comprises:
   monitoring a PDCCH and receiving a paging message when the preset indication signaling indicates that it is needed for the UE to perform the PDCCH monitoring and the paging message reception.

9. The measurement method according to claim 8, wherein a same field in the preset indication signaling is used to indicate whether it is needed to perform the RRM measurement and whether it is needed to perform the PDCCH monitoring and the paging message reception, or different fields in the preset indication signaling are used to indicate whether it is needed to perform the RRM measurement and whether it is needed to perform the PDCCH monitoring and the paging message reception.

10. The measurement method according to claim 2, wherein, when the RRM measurement comprises the RRM measurement of the current cell, the performing the RRM measurement comprises:
   acquiring a state parameter of the UE;
   determining whether it is needed to perform the RRM measurement of the current cell according to the state parameter of the UE;
   performing the RRM measurement of the current cell when it is determined that it is needed to perform the RRM measurement of the current cell.

11. The measurement method according to claim 10, wherein, after the acquiring the state parameter of the UE, the method further comprises:
   transmitting the state parameter of the UE to the base station, wherein the state parameter is used to transmit the preset indication signaling by the base station according to the state parameter.

12. The measurement method according to claim 10, wherein the state parameter comprises at least one of: a type of the UE, an environment where the UE is located, mobility status information of the UE, service status information of the UE or signal coverage information of a location of the UE.

13. A measurement configuration method, comprising:
   transmitting a preset indication signaling to a user equipment (UE) before blind-detection of a paging signal or PDCCH;
   wherein the preset indication signaling is configured to indicate whether the UE is to perform a radio resource management (RRM) measurement.

14. The measurement configuration method according to claim 13, wherein the transmitting the preset indication signaling to the UE comprises:
   acquiring a state parameter of the UE;
   acquiring the preset indication signaling according to the state parameter;
   transmitting the preset indication signaling to the UE.

15. The measurement configuration method according to claim 14, wherein the state parameter comprises at least one of: a type of the UE, an environment where the UE is located, mobility status information of the UE, service status information of the UE or signal coverage information of a location of the UE.

16. The measurement configuration method according to claim 13, wherein the preset indication signaling comprises at least one of: a prior indication signaling, a wake-up signaling (WUS) or a go to sleep signaling (GTS).

17. The measurement configuration method according to claim 13, wherein the transmitting the preset indication signaling to the UE comprises:
   transmitting the preset indication signaling to the UE at a preset position;
   wherein the preset position is a preset fixed position, or the preset position is a position having a preset time domain offset and/or preset frequency domain offset from a preset signaling;
   wherein the preset signaling comprises at least one of: a periodic reference signaling, a prior indication signaling, a wake-up signaling (WUS), a go to sleep signaling (GTS) or a paging message.

18. The measurement configuration method according to claim 13, wherein, after the transmitting the preset indication signaling to the UE, the method further comprises:
   transmitting information of a target cell to the UE;
   wherein the target cell is a neighboring cell of a current cell and/or a cell at a frequency different from a frequency of the current cell;
   the current cell is a camp cell or a serving cell of the UE.

19. A user equipment (UE), comprising: a memory, a processor and a program stored in the memory and configured to be executed by the processor, wherein the processor is configured to execute the program, to implement steps of the measurement method according to claim 1.

20. A base station, comprising: a memory, a processor and a program stored in the memory and configured to be executed by the processor, wherein the processor is configured to execute the program, to implement steps of the measurement configuration method according to claim 13.

* * * * *